United States Patent
Yuan

(10) Patent No.: US 10,261,779 B2
(45) Date of Patent: Apr. 16, 2019

(54) DEVICE WHICH IS OPERABLE DURING FIRMWARE UPGRADE

(71) Applicant: Axis AB, Lund (SE)

(72) Inventor: Song Yuan, Sodra Sandby (SE)

(73) Assignee: Axis AB, Lund (SE)

( * ) Notice: Subject to any disclaimer, the term of this patent is extended or adjusted under 35 U.S.C. 154(b) by 0 days.

(21) Appl. No.: 15/448,176

(22) Filed: Mar. 2, 2017

(65) Prior Publication Data

US 2017/0269927 A1 Sep. 21, 2017

(30) Foreign Application Priority Data

Mar. 15, 2016 (EP) .................................... 16160338

(51) Int. Cl.
| | | |
|---|---|---|
| *G06F 21/57* | (2013.01) | |
| *G06F 8/654* | (2018.01) | |
| *G06F 8/656* | (2018.01) | |
| *G06F 9/455* | (2018.01) | |
| *G06F 9/4401* | (2018.01) | |
| *G06F 9/44* | (2018.01) | |

(52) U.S. Cl.
CPC .............. *G06F 8/656* (2018.02); *G06F 8/654* (2018.02); *G06F 9/4411* (2013.01); *G06F 9/45558* (2013.01); *G06F 21/572* (2013.01); *G06F 9/45541* (2013.01); *G06F 2009/45579* (2013.01); *G06F 2009/45583* (2013.01)

(58) Field of Classification Search
CPC ...... G06F 8/67; G06F 9/4411; G06F 9/45558; G06F 21/57
USPC ........................................................ 717/168
See application file for complete search history.

(56) References Cited

U.S. PATENT DOCUMENTS

| | | | | |
|---|---|---|---|---|
| 7,069,452 B1* | 6/2006 | Hind | ..................... | G06F 21/572 |
| | | | | 713/1 |
| 7,548,986 B1* | 6/2009 | Yang | ...................... | H04L 67/06 |
| | | | | 709/231 |
| 8,201,161 B2* | 6/2012 | Challener | ........... | G06F 9/45537 |
| | | | | 717/168 |
| 8,943,489 B1 | 1/2015 | Qu | | |

(Continued)

FOREIGN PATENT DOCUMENTS

| | | |
|---|---|---|
| EP | 1 083 483 A1 | 3/2001 |
| JP | 2008-243183 | 10/2008 |
| KR | 10-0883208 | 2/2009 |

OTHER PUBLICATIONS

European Search Report (with European Search Opinion) dated May 6, 2016 in European Application 16160338.6 filed on Mar. 15, 2016.

(Continued)

*Primary Examiner* — Ryan D. Coyer
(74) *Attorney, Agent, or Firm* — Oblon, McClelland, Maier & Neustadt, L.L.P.

(57) ABSTRACT

There is provided a device (100) having hardware (102) and a first, upgradable, firmware (106) for controlling the hardware. The device further has a hypervisor (104) which links the first firmware to the hardware so as to control access of the first firmware to the hardware. In preparation for an upgrade of the first firmware, the hypervisor is configured to deny access of the first firmware to the hardware, access a second firmware, and control the hardware by the second firmware.

13 Claims, 3 Drawing Sheets

(56) References Cited

U.S. PATENT DOCUMENTS

| | | | |
|---|---|---|---|
| 2003/0031460 A1* | 2/2003 | Obrador | G06F 17/30817 |
| | | | 386/230 |
| 2005/0125652 A1* | 6/2005 | Singer | G06F 21/572 |
| | | | 713/2 |
| 2006/0143600 A1* | 6/2006 | Cottrell | G06F 21/572 |
| | | | 717/168 |
| 2007/0174849 A1 | 7/2007 | Cheung et al. | |
| 2007/0253699 A1* | 11/2007 | Yen | G06K 9/00664 |
| | | | 396/311 |
| 2008/0109798 A1 | 5/2008 | Gavens et al. | |
| 2008/0244553 A1 | 10/2008 | Cromer et al. | |
| 2009/0178033 A1 | 7/2009 | Challener et al. | |
| 2011/0131563 A1 | 6/2011 | Ohama et al. | |
| 2012/0023309 A1* | 1/2012 | Abraham | G06F 11/00 |
| | | | 712/30 |
| 2012/0081577 A1* | 4/2012 | Cote | H04N 19/80 |
| | | | 348/231.99 |
| 2012/0254865 A1 | 10/2012 | Saeki et al. | |
| 2013/0179872 A1 | 7/2013 | Kuzmack et al. | |
| 2013/0268688 A1* | 10/2013 | Galanes | H04N 21/23116 |
| | | | 709/231 |
| 2013/0272374 A1* | 10/2013 | Eswaran | H04L 65/602 |
| | | | 375/240.02 |
| 2014/0095927 A1 | 4/2014 | Abraham et al. | |
| 2014/0237464 A1 | 8/2014 | Waterman et al. | |
| 2014/0281469 A1 | 9/2014 | Ali et al. | |
| 2014/0289864 A1 | 9/2014 | Dimitrakos et al. | |

OTHER PUBLICATIONS

Korean Office Action dated Sep. 12, 2018 in Korean Application No. 10-2017-0030785 w/English translation, 3 pages.

\* cited by examiner

DEVICE WHICH IS OPERABLE DURING FIRMWARE UPGRADE

TECHNICAL FIELD

The present invention relates to the field of devices having hardware being controlled by firmware. In particular, it relates to a device and a method which facilitates operation of the device during upgrade of its firmware.

BACKGROUND

It is common that electronic devices, such as video cameras, mobile phones and other embedded devices, use firmware to control the hardware of the device. Firmware is a type of software that provides control of devices and systems. The firmware needs to be upgraded from time to time, for example in order to add new features or correct errors.

During firmware upgrade, a process which may take several minutes, the operation of the device is typically interrupted. This may in some situations be highly undesirable, for example when there is a need for the electronic device to provide a round-the-clock service. Such a situation may for instance occur with respect to video cameras which are used for surveillance purposes, electronic devices being used in an access system, or mobile phones.

A related situation is disclosed in the published patent application US 2009/0178033 A. It relates to a computer system to which a peripheral device having hardware is attached. The computer system has a virtualized environment which allows several operating systems, including a privileged operating system and guest operating system, to run on the computer system. During update of firmware relating to the device, the privileged operating system denies access of the guest operating systems to the device. In this way, one may avoid shutdown of the entire computer system during firmware upgrade. However, the device to which the firmware relates will not operate during the upgrade. There is thus need for improvements.

SUMMARY OF THE INVENTION

In view of the above, it is thus an object of the present invention to facilitate operation of a device during upgrade of a firmware used to control hardware of the device.

According to a first aspect of the invention, the above object is achieved by a device comprising:
hardware,
a first, upgradable, firmware for controlling the hardware, and
a hypervisor linking the first firmware to the hardware so as to control access of the first firmware to the hardware,
wherein the hypervisor is configured to, in preparation for an upgrade of the first firmware, deny access of the first firmware to the hardware, access a second firmware, and control the hardware by the second firmware.

It is thus proposed to arrange an extra layer—a hypervisor—between the hardware and the first firmware. During normal operation of the device, the hardware is controlled by the first hardware. When the first firmware is about to be upgraded, the hypervisor denies access of the first firmware to the hardware, and instead controls the hardware using a second firmware. In this way, the hypervisor takes over the control of the device using the second firmware, and as a result the device is operable even during upgrade of the first firmware.

An additional advantage of having a hypervisor is that the hypervisor may perform security controls on every register write and read performed by the first firmware when controlling the hardware. In this way, one may prevent that malicious software sabotages the hardware.

The hypervisor may generally comprise software, firmware, hardware or combinations thereof for controlling the hardware and providing an interface to the first firmware which is identical to that of the hardware.

The hypervisor may further be configured to, after the upgrade of the first firmware, re-establish access of the first firmware to the hardware, and hand over control of the hardware to the first firmware. In this way, the first firmware may thus resume control of the hardware once the upgrade is completed.

Preferably, the hypervisor comprises at least a portion of the second firmware. The remaining portion of the second firmware may be stored somewhere else in the device, such that it is accessible to the hypervisor. In some embodiments, the hypervisor comprises the second firmware. This is advantageous for reasons of security. In more detail, when the hypervisor comprises the second firmware, or at least a portion of it, it becomes more difficult to manipulate the second firmware compared to if the second firmware was stored somewhere else in the device. If someone tried to manipulate the second firmware, the operation of the device would be compromised.

The second firmware may be "slim" in comparison to the first firmware. This means inter alia that when the second firmware is used to operate the device, the device will have a reduced functionality compared to if the first firmware is used to operate the device. In more detail, the first firmware may be configured to control the hardware such that the device is operable with first functionalities, and the second firmware may be configured to control the hardware such that the device is operable with second functionalities, the second functionalities being reduced in relation to the first functionalities. In this way, the device is operable during firmware upgrade, albeit with a reduced functionality. This is advantageous for reasons of saving processing resources, network bandwidth, memory resources etc. Instead, most of the available resources may be spent on the first firmware and the upgrade of the first firmware.

Typically, the device has a limited amount of memory. During upgrade of the first firmware, most of the available memory is used for the upgrade process and only a small amount is reserved for the hypervisor running the second firmware. Due to the memory limitations, it is therefore further advantageous if the memory footprint (including run-time memory and memory for storing the firmware itself) of the second firmware is smaller than that of the first firmware. In more detail, the first firmware may be configured to control the hardware having a first memory resource at its disposal, and the second firmware may be configured to control the hardware having a second memory resource at its disposal, wherein the second memory resource is smaller than the first memory resource.

Preferably the hypervisor is of type 1, which is also known as a native or bare-metal hypervisor. This is a hypervisor running directly on the hardware. The hypervisor of type 1 is advantageous in that it has direct control over the hardware and has no dependencies on other software.

Alternatively, the hypervisor may be of type 2, that is a computer program running on a primary operating system.

The device may generally be any type of device having hardware being controlled by firmware, such as any embedded device. According to one embodiment, the device is a video camera. Due to the hypervisor taking over the control of the hardware using the second firmware, the video camera is operable during upgrade of the first firmware. The video camera may thus deliver video non-stop, even during firmware upgrade. This is particularly advantageous in case the video camera is used for surveillance purposes, where interruption of the operation of the video camera is a security risk.

The video camera may have an imaging pipeline. By imaging pipeline, as used herein, is generally meant a set of components used to process sensor raw data of the camera to produce a bit stream of encoded video data which is formatted for transmittal over a network. The first and the second firmware may each comprise drivers and software instructions for controlling the imaging pipeline of the camera. Thus, during firmware upgrade, the imaging pipeline of the camera is still operable to process sensor raw data to produce a bit stream of encoded video data for transmittal over a network.

The drivers and software instructions of the first firmware and the drivers and software instructions of the second firmware may be different. In particular, the drivers and software instructions of the second firmware may be different in the sense that they give rise to a reduced functionality of the imaging pipeline in comparison to the first firmware.

As used herein, a driver is a computer program that controls a piece of hardware. The driver provides a software interface to the piece of hardware such that the software instructions of the firmware may access hardware functions without needing to know precise details of the piece of hardware being used.

The components of the imaging pipeline may generally comprise hardware blocks having corresponding firmware. According to embodiments, the imaging pipeline may comprise hardware blocks configured for imaging, image scaling, video encoding, and providing a network interface. Moreover, the first and the second firmware may each comprise drivers and software instructions corresponding to the hardware blocks.

The imaging block and its corresponding firmware are generally configured to process raw sensor image data to produce enhanced image data. The image scaling block and its corresponding firmware are generally configured to scale image data, typically enhanced image data produced by the imaging block. The video encoding block and its corresponding firmware are generally configured to encode the enhanced and scaled image data, or rather a stream of enhanced and scaled image data, to produce an encoded video stream. The network interface block and its corresponding firmware are generally configured to format the encoded video stream for transmission over a network, and transmitting the encoded video stream over the network.

The hypervisor generally controls access of the first firmware to the hardware. That is, the hypervisor controls when the first firmware is allowed to read from and write to hardware registers. In particular, the hypervisor is configured to control access of the drivers and software instructions of the first firmware to the corresponding hardware blocks. In this way, the hypervisor may thus control access of the first firmware to the different hardware blocks.

According to a second aspect of the invention, the above object is achieved by a method for facilitating operation of a device during upgrade of a first firmware which is configured to control hardware of the device. The method is performed by a hypervisor linking the first firmware to the hardware. The method comprises: in preparation for the upgrade of the first firmware, denying access of the first firmware to the hardware, accessing a second firmware, and controlling the hardware by the second firmware.

The method may further comprise: after the upgrade of the first firmware, re-establishing access of the first firmware to the hardware, and handing over control of the hardware to the first firmware.

The second aspect may generally have the same features and advantages as the first aspect. It is further noted that the invention relates to all possible combinations of features unless explicitly stated otherwise.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings, where the same reference numerals will be used for similar elements, wherein.

DETAILED DESCRIPTION OF EMBODIMENTS

The present invention will now be described more fully hereinafter with reference to the accompanying drawings, in which embodiments of the invention are shown. The systems and devices disclosed herein will be described during operation.

Figure 1:
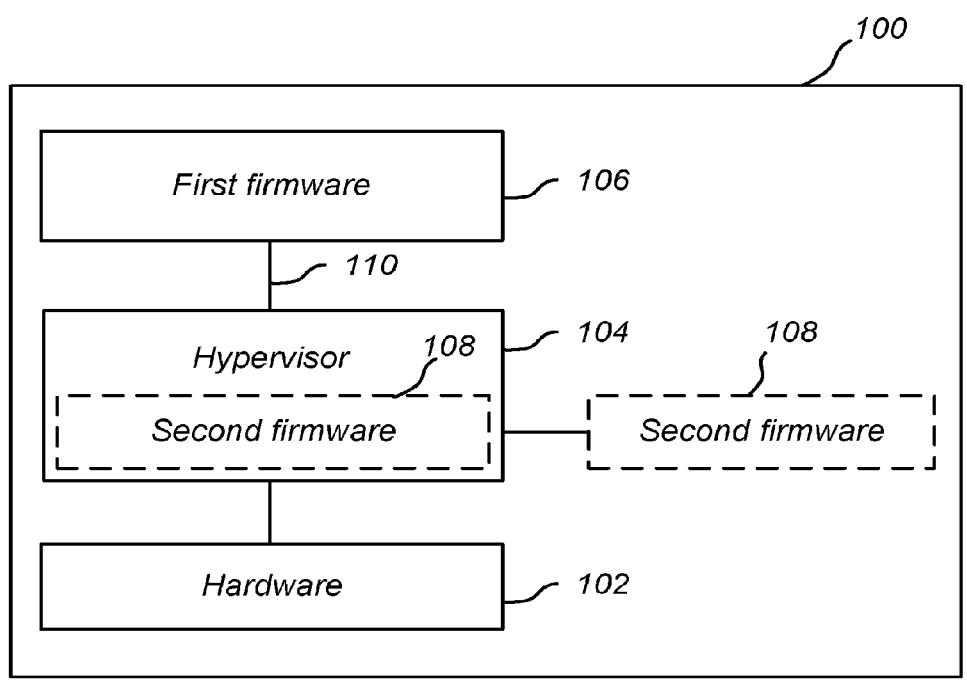
FIG. 1 is a schematic illustration of a device having upgradable firmware according to embodiments.

FIG. 1 shows a device 100 according to embodiments. The device 100 comprises hardware 102, a hypervisor 104, and a first firmware 106. To mention a few examples, the device 100 may be an embedded device, such as a mobile phone, a video camera, and a device in an access system. Examples of devices in an access system are an access controller, a door station, and a card reader.

The hypervisor 104 is arranged between the hardware 102 and the first firmware 106. The hypervisor 104 thus links the first firmware to the hardware. In this way, the first firmware 106 may only access the hardware 102 via the hypervisor 104, i.e. every read from hardware registers and write to hardware registers by the first firmware 106 goes via the hypervisor 104. The hypervisor 104 may further control the access of the first firmware 106 to the hardware 102.

In particular, the hypervisor 104 may deny access of the first firmware to the hardware 102, e.g., by cutting a control link 110 which links the first firmware 106 to the hardware 102 via the hypervisor 104. The hypervisor 104 may further re-establish access of the first firmware 106 to the hardware 102, e.g., by re-establishing the control link 110.

The hypervisor 104, which may be implemented in software, firmware, hardware or combinations thereof, generally provides an interface to the first firmware 106 which is identical to that of the hardware 102. The hypervisor 104 is preferably of type 1, which is also known as native or bare-metal hypervisor. Alternatively, the hypervisor 104 may be of type 2, also known as a hosted hypervisor, i.e. a computer program running on an operating system. Software and firmware of the hypervisor 104 may be stored in a non-volatile, preferably read-only, memory of the device 100.

The first firmware 106 comprises software for controlling the hardware 102. The first firmware 106 is upgradable, meaning that it may be replaced, overwritten or reprogrammed. The first firmware 106 is typically stored in a non-volatile, writable, memory of the device 100, such as an EEPROM or a flash memory. The first firmware 106 and software and firmware of the hypervisor 104 may either be stored in the same non-volatile memory (which is cost efficient) or in separate non-volatile memories. In the latter case, the non-volatile memory of the first firmware 106 may be writable, while the non-volatile memory of the hypervisor 104 may be read-only, which is preferable from a security point of view.

The device 100 further comprises a second firmware 108, which is different from the first firmware 108. The second firmware 108 also comprises software for controlling the hardware 102. The second firmware 108 is arranged to be accessible to the hypervisor 104. Preferably, for reasons of security, the second firmware 108 is comprised in the hypervisor 104, meaning that the second firmware 108 forms part of the firmware of the hypervisor 104. For example, the first firmware 106 and firmware of the hypervisor 104, including the second firmware 108, may be stored in separate non-volatile memories as described above. However, in some embodiments, the second firmware 108 is not part of the hypervisor 104. The second firmware 108 may for instance be stored outside of the hypervisor 104, such as in a separate file, a separate part of a common memory storage, or in a separate memory storage. However, the hypervisor 104 may still access the second firmware 108 and proceed to execute any software instructions and drivers of the second firmware 108 in order to control the hardware 102. It is also possible that the second firmware 108 is partly comprised in the hypervisor 108, and partly stored outside of the hypervisor 104.

The device 100 may further comprise one or more processors for executing software and firmware instructions, such as instructions implemented by the first firmware 106, the hypervisor 104, and the second firmware 108.

The first and the second firmware 106, 108 may each comprise different layers. Typically, the first and the second firmware 106, 108 may each comprise drivers and other software instructions. The drivers form a first layer and provide a software interface to the hardware 102, enabling the other software instructions, forming further layers, to access the hardware 102 without knowing any details of the hardware 102 being used.

Figure 2:
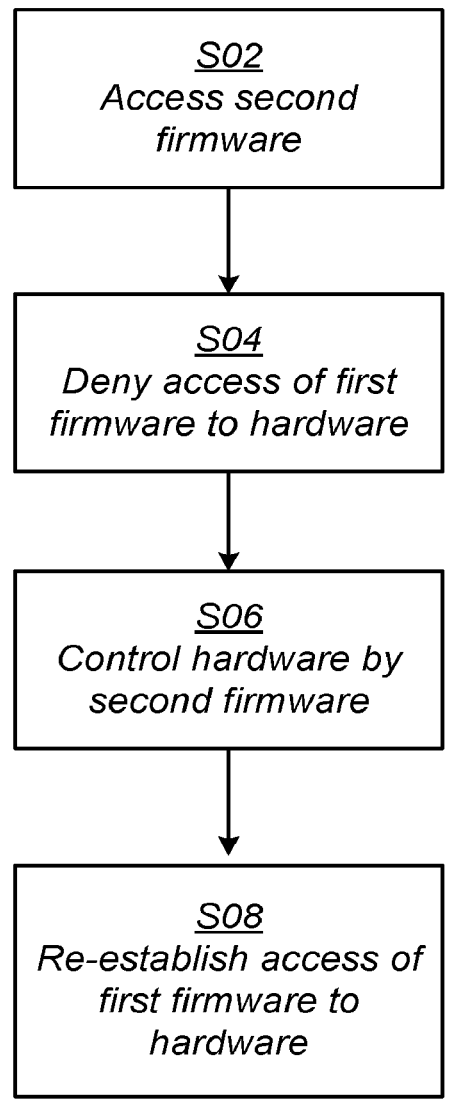
FIG. 2 is a flowchart of a method according to embodiments for facilitating operation of a device during firmware upgrade.

As described above, the first and the second firmware 106, 108 are both configured for controlling the hardware 102 of the device 100. However, the second firmware 108 is typically different from the first firmware 106 in that it controls the camera with a reduced functionality in comparison to the first firmware. For example, the second firmware 108 may implement fewer functions than the first firmware 108, and/or the second firmware 108 may implement simpler, less memory intense, functions than the first firmware 108. This will be further exemplified below in conjunction with FIG. 2. In this way, the memory footprint (both in terms of run-time memory and storage) of the second firmware 106 may be kept at a low level compared to the first firmware 108.

In the following, the operation of the device 100 will be described. The device 100 may operate in two modes: a normal operating mode in which the first firmware 106 controls the hardware 102, and a firmware upgrade mode in which the hypervisor 104 controls the hardware 102 by the second firmware 108. The hypervisor 104 may be triggered to switch from the normal operating mode to the firmware upgrade mode by the first firmware 106. In more detail, software in the first firmware 106 may invoke functions in the hypervisor 104 to switch from the normal operating mode to the firmware upgrade mode.

When in normal operating mode, the first firmware 106 has access to the hardware 102 via the hypervisor 104. In other words, there is a control link 110 between the first firmware 106 and the hardware 102 established by the hypervisor 104, such that the first firmware 106 may read and write registers of the hardware 102. In the normal operating mode, the hypervisor 104 exposes the hardware functionalities directly to the first firmware 106, thereby allowing the first firmware to control the hardware 102.

When in firmware upgrade mode, the first firmware 106 is upgraded. Meanwhile, the hypervisor 104 takes control of the hardware 102. A method for facilitating the operation of the device 100 during the upgrade of the first firmware 106 will now be disclosed with reference to FIG. 1 and the flowchart of FIG. 2.

In preparation for the upgrade of the first firmware 106, the hypervisor 104 in step S02 accesses the second firmware 108. As further discussed above, the second firmware 108 may wholly or partially be comprised in the hypervisor 104 or it may wholly or partially be stored outside of the hypervisor 104. When the hypervisor 104 has accessed the second firmware 108, it may deny access S04 of the first firmware 106 to the hardware 102. This means that the hypervisor 104 cuts off the control link 110 between the first firmware 106 and the hardware 102. The first firmware 106 is thereby disconnected from the hardware 102 and is disabled from controlling the hardware 102. Instead, in order to provide a non-stop operation of the device 100, the hypervisor 104 starts to control S06 the hardware 102 using the second firmware 108. In more detail, the hypervisor 104 proceeds to execute software instructions and drivers of the second firmware 108 in order control the hardware 102. At this moment, the first firmware 106 may be upgraded without losing the operation of the device. However, depending on the second firmware 108, the device 100 may be operable with reduced functionality.

Once the upgrade of the first firmware 106 has been completed, the hypervisor 104 may, in step S08, re-establish access of the first firmware 106 to the hardware 102, i.e. re-establish the control link 110, and hand over control of the hardware 102 to the first firmware 106.

Figure 3:
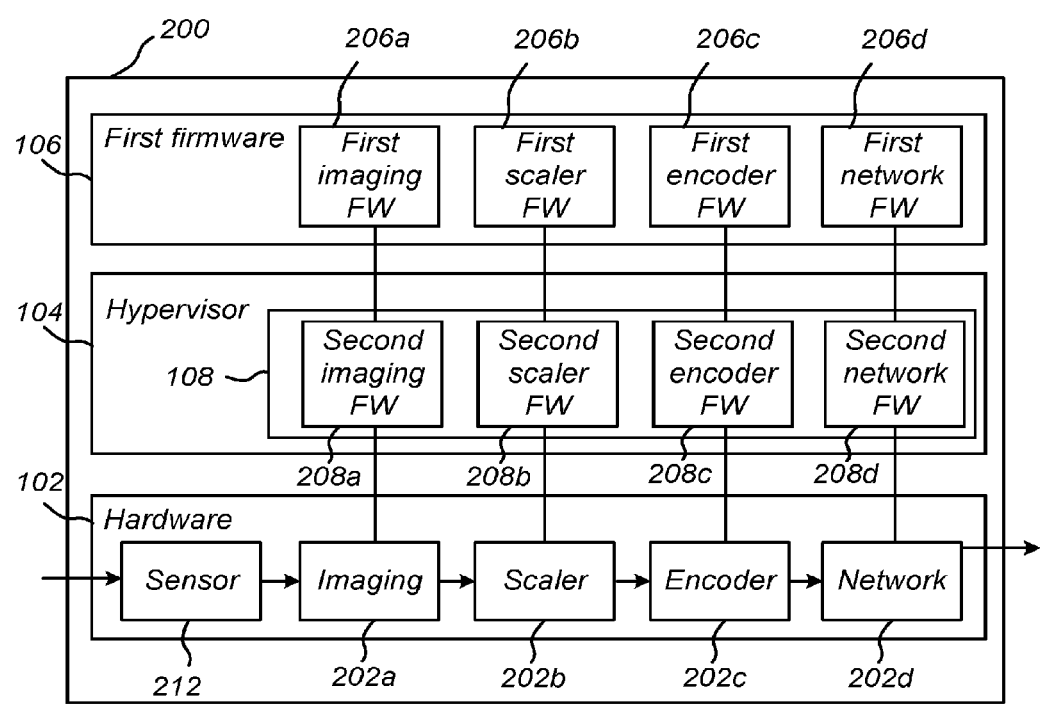
FIG. 3 is a schematic illustration of a video camera having upgradable firmware according to embodiments.

FIG. 3 illustrates an embodiment in which the device is a video camera 200. The video camera 200 has an imaging pipeline which includes a set of components used to process sensor raw data, received from the sensor 212, to produce an encoded video stream which is formatted for transmittal over a network. In this example, the imaging pipeline is assumed to comprise an imaging component, an image scaling component, an encoding component, and a network interface component. Each component in the imaging pipeline typically comprises a block of firmware, including drivers and software instructions, being configured to control a corresponding block of hardware. In the illustrated embodiment, the first firmware 106 comprises an imaging firmware block 206a corresponding to an imaging hardware block 202a, a scaler firmware block 206b corresponding to a scaler hardware block 202b, an encoder firmware block 206c corresponding to an encoder hardware block 202c, and a network interface firmware block 206d corresponding to a network interface hardware block 202d. Similarly, the second firmware 104 comprises an imaging firmware block 208a corresponding to the imaging hardware block 202a, a scaler firmware block 208b corresponding to a scaler hardware block 202b, an encoder firmware block 208c corresponding to an encoder hardware block 202c, and a network interface firmware block 208d corresponding to a network interface hardware block 202d.

The role of the imaging component of the imaging pipeline is to process and enhance a video stream of sensor raw data, e.g., by performing demosaicing, white balancing, vignetting correction, sharpening, colour matrixing, dark curent correction, column fixed pattern noise correction, defect pixel correction, and noise filtering.

The role of the scaler component of the imaging pipeline is to scale the enhanced video stream of image data which is output of the imaging block 202a. The scaler component may also include transforming image data, such as performing dewarping and barrel distortion correction, and including overlays in the images.

The role of the encoder component is to encode the enhanced and scaled stream of image data which is output from the scaler block 202b to produce an encoded video stream on a video coding format, such as MJPEG, H.264 or H.265.

The role of the network interface component is to process the encoded video stream to a format which is suitable for transmission over a network, and to transmit the formatted video stream over the network. This may, e.g., include an ethernet interface, a WiFi interface, a 3G/4G interface, a Z-wave interface etc.

As further discussed above, e.g., in conjunction to FIG. 1, the hypervisor 104 controls the hardware 102 by the second firmware 108 during upgrade of the first firmware 106. In this example, the hypervisor 104 thus drives the imaging pipeline of the video camera 200 during upgrade of the first firmware 106 using the second firmware 108. In other words, the hypervisor 104 uses the imaging firmware block 208a, the scaler firmware block 208b, the encoder firmware block 208c and the network interface block 208d of the second firmware 108 to control the corresponding hardware blocks 202a, 202b, 202c, 202d during upgrade of the first firmware 106.

Typically, only a small amount of the system memory is reserved for the hypervisor 104 during this process, the rest is used for upgrading the first firmware 106 followed by a system boot. In order to deal with the limited memory resources, the second firmware 108 may be configured to control the hardware 102 with a reduced functionality, which in this case means that the imaging pipeline of the video camera 200 has a reduced functionality during the firmware upgrade mode as compared to the normal operation mode.

In more detail, the second firmware 108 may implement fewer functions than the first firmware 106. Typically, functions that are not fundamental for the operation of the video camera 200 and/or processing, bandwidth or memory intense functions will be turned-off compared to the first firmware 106. Typically, the second firmware 108 will not implement any features that belong to an operating system, such as memory management or process scheduling. This means that certain functions are not supported, such as analytics or metadata streams. This is in contrast to the first firmware 106. The analytics may include analytics carried out in software or analytics being related to a specific hardware. Such analytics is typically disabled in the second firmware 108, since it may require separate video streams and extra processing. For instance, the second firmware 108 may send a low resolution stream, with only the luminance component (i.e. just Y, not CbCr) of the image data to a motion detection algorithm.

For example, on one hand, the imaging firmware block 206a of the first firmware 106 may be configured to include all kinds of image processing, such as demosaicing, white balancing, vignetting correction, sharpening, colour matrixing, dark curent correction, column fixed pattern noise correction, defect pixel correction, (temporal) noise filtering, crosstalk correction and exposure merge. On the other hand, the imaging firmware block 208a of the second firmware 108 may be configured to only run fundamental processing steps such as demosaicing and defect pixel correction. Other processing steps, such as exposure merge and temporal filtering which are not fundamental and cost a lot of system memory and/or processing power will be turned-off.

Similarly, on one hand, the scaler firmware block 206b of the first firmware 106 may be configured to scale image data, transform image data (by, e.g., performing dewarping and barrel distortion correction), and include overlays in the images. On the other hand, the scaler firmware block 208b of the second firmware 108 may be configured to let the video stream through without any scaling, transformation or addition of overlays.

The second firmware 108 may further implement functions that are less memory-intense, and/or less processing intense, and/or less bandwidth demanding compared to the first firmware 106. This may include processing one video stream instead of a plurality of video streams, and/or processing image data at a lower resolution instead of at a normal resolution. In this way, most of the memory, processing and bandwidth resources are spent on the first firmware 106 (or on upgrade of the first firmware 106) which is used during normal operation of the device.

According to further examples, the encoding firmware block 206c of the first firmware 106 may be configured to support a number of video encoding formats, such as H.264, H.265, and MJPEG. The second firmware block 208c may be configured to only support MJPEG, since it does not require storing of reference frames in the memory, thereby being less memory intense.

Similarly, the network interface firmware block 206d of the first firmware 106 may have full ethernet support and a complete http server, whereas the network interface firmware block 208d of the second firmware 108 may only have basic ethernet support and a simplified http server.

It will be appreciated that a person skilled in the art can modify the above-described embodiments in many ways and still use the advantages of the invention as shown in the embodiments above. For example, the device is not limited to a video camera, but could for instance be a mobile phone. In such an example, the second firmware may have a reduced functionality in comparison to the first firmware in that it, e.g., only allows emergency calls during firmware upgrade. According to other examples, the device may be an access controller, a door camera station, a wireless speaker etc. Thus, the invention should not be limited to the shown embodiments but should only be defined by the appended claims. Additionally, as the skilled person understands, the shown embodiments may be combined.

The invention claimed is:

1. A device, comprising:
   hardware,
   a first, upgradable, firmware for controlling the hardware,
   a hypervisor linking the first firmware to the hardware such that the hardware is only accessible to the first firmware via the hypervisor, wherein the hypervisor is configured to provide an interface to the first firmware which is identical to that of the hardware and to control access of the first firmware to the hardware, and a second firmware for controlling the hardware, wherein the hypervisor comprises the second firmware but not the first firmware, and wherein the device is configured to operate in a first mode when the hardware is controlled by the first firmware, and in a second mode during upgrade of the first firmware, wherein the hypervisor is configured to switch from the first mode to the second mode by denying access of the first firmware to the hardware, and controlling the hardware by the second firmware.

2. The device of claim 1, wherein the hypervisor is further configured to, after upgrade of the first firmware, re-establish access of the first firmware to the hardware, and hand over control of the hardware to the first firmware.

3. The device of claim 1, wherein the first firmware is configured to control the hardware such that the device is operable with first functionalities, and wherein the second firmware is configured to control the hardware such that the device is operable with second functionalities, the second functionalities being reduced in relation to the first functionalities.

4. The device of claim 1, wherein the first firmware is configured to control the hardware having a first memory resource at its disposal, and wherein the second firmware is configured to control the hardware having a second memory resource at its disposal, wherein the second memory resource is smaller than the first memory resource.

5. The device claim 1, wherein the hypervisor is of type 1.

6. The device of claim 1, wherein the hypervisor is of type 2.

7. The device of claim 1, wherein the device is a video camera.

8. The device of claim 7, wherein the first and the second firmware each comprises drivers and software instructions for controlling an imaging pipeline of the camera.

9. The device of claim 8, wherein the imaging pipeline comprises hardware blocks configured for imaging, image scaling, video encoding, and providing a network interface.

10. The device of claim 9, wherein the first and the second firmware each comprises drivers and software instructions corresponding to the hardware blocks.

11. The device of claim 10, wherein the hypervisor is configured to control access of the drivers and software instructions of the first firmware to the corresponding hardware blocks.

12. A method, performed by a hypervisor, for facilitating operation of a device during upgrade of a first firmware which is configured to control hardware of the device when in a first operation mode, wherein the hypervisor links the first firmware to the hardware such that the hardware is only accessible to the first firmware via the hypervisor, wherein the hypervisor does not comprise the first firmware, and wherein the hypervisor is configured to provide an interface to the first firmware which is identical to that of the hardware and to control access of the first firmware to the hardware, the method comprising:

switching from the first operation mode to a second operation mode during which the first firmware is upgraded by denying access of the first firmware to the hardware, and controlling the hardware by a second firmware which is comprised in the hypervisor.

13. The method of claim 12, further comprising after an upgrade of the first firmware, re-establishing access of the first firmware to the hardware, and handing over control of the hardware to the first firmware.

* * * * *